(12) United States Patent
Takegawa et al.

(10) Patent No.: US 8,367,917 B2
(45) Date of Patent: Feb. 5, 2013

(54) HOOP FOR A DRUM AND METHOD OF MAKING THE SAME

(75) Inventors: Akito Takegawa, Yachiyo (JP);
Michihiro Tsuchida, Tokyo (JP)

(73) Assignee: Pearl Musical Instrument Co., Chiba (JP)

( * ) Notice: Subject to any disclaimer, the term of this patent is extended or adjusted under 35 U.S.C. 154(b) by 0 days.

(21) Appl. No.: 13/137,418

(22) Filed: Aug. 15, 2011

(65) Prior Publication Data

US 2012/0174733 A1    Jul. 12, 2012

Related U.S. Application Data

(60) Provisional application No. 61/457,134, filed on Jan. 10, 2011.

(51) Int. Cl.
*G10D 13/02* (2006.01)
(52) U.S. Cl. ...................................... 84/411 R
(58) Field of Classification Search ................. 84/411 R
See application file for complete search history.

(56) References Cited

U.S. PATENT DOCUMENTS

| | | | |
|---|---|---|---|
| 2,779,227 A * | 1/1957 | Slingerland, Jr. ........... | 84/411 R |
| 4,448,105 A * | 5/1984 | Cordes .......................... | 84/413 |
| RE33,685 E * | 9/1991 | Andre et al. ................... | 84/413 |
| 5,121,666 A | 6/1992 | Valen | |
| 5,261,309 A | 11/1993 | Valen | |
| 5,537,908 A | 7/1996 | Rabe et al. | |
| 5,554,812 A | 9/1996 | Donohoe | |
| 6,043,419 A | 3/2000 | Arbiter | |
| 6,166,311 A | 12/2000 | Barrickman | |
| 6,350,941 B1 | 2/2002 | Miller et al. | |
| 6,489,547 B2 | 12/2002 | Chang | |
| 6,552,253 B1 | 4/2003 | Chen | |
| 6,953,883 B1 | 10/2005 | Jacobson | |
| 7,119,263 B1 | 10/2006 | Chen | |
| 7,291,777 B2 | 11/2007 | Chen | |
| 7,495,160 B2 * | 2/2009 | Hoshino et al. ............. | 84/411 R |
| 7,511,209 B1 | 3/2009 | Liao | |
| 7,781,659 B2 | 8/2010 | Liao | |
| 7,786,363 B1 * | 8/2010 | Wei .............................. | 84/411 R |
| 7,910,817 B1 * | 3/2011 | Huang ......................... | 84/411 R |
| 2002/0104427 A1 * | 8/2002 | Shah ............................ | 84/411 R |
| 2006/0016319 A1 * | 1/2006 | Ito ................................ | 84/411 R |
| 2012/0174733 A1 * | 7/2012 | Takegawa et al. ............. | 84/413 |

* cited by examiner

*Primary Examiner* — David Warren
*Assistant Examiner* — Robert W Horn
(74) *Attorney, Agent, or Firm* — Bass, Berry & Sims, PLC

(57) ABSTRACT

A hoop for securing a drum head to a drum, the hoop having a lower portion configured to mount the hoop to a shell of the drum and a flange formed in the lower portion of the hoop. The flange being configured to receive a tension control device for tuning the drum head. The hoop may also include an upper portion that is above and normal to the flange and an annular upper edge formed on the upper portion of the hoop that is rolled over and bent inward toward an inner peripheral surface of the hoop. The upper portion may be fixed to the inner peripheral surface of the hoop be welding or another method of fixing.

11 Claims, 6 Drawing Sheets

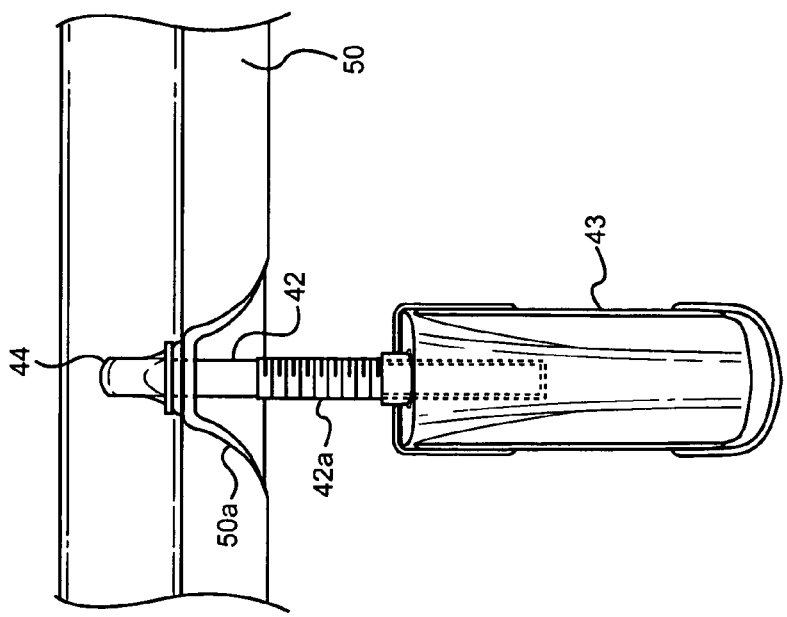
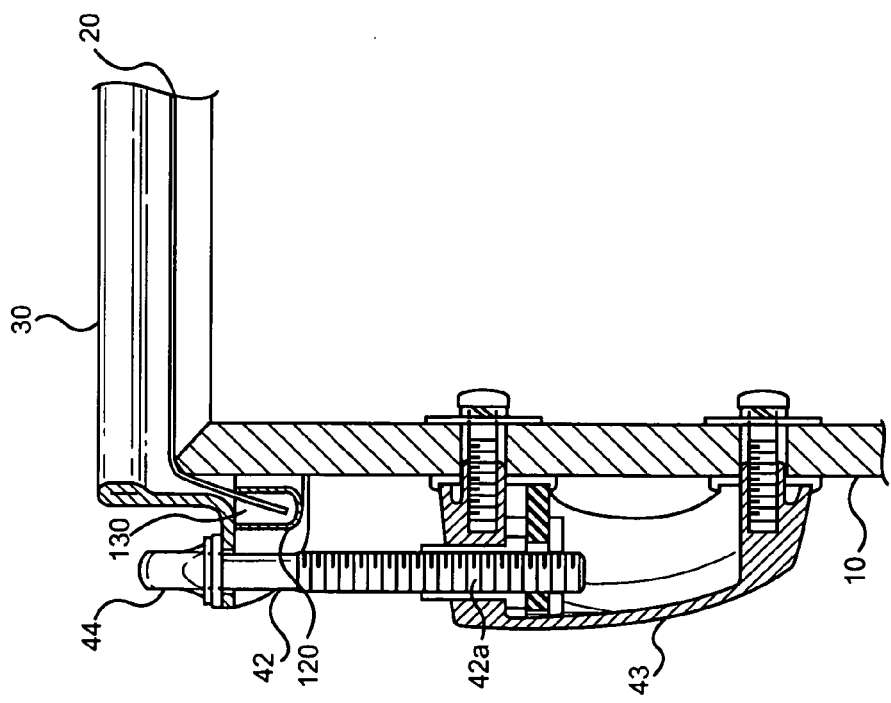

HOOP FOR A DRUM AND METHOD OF MAKING THE SAME

CROSS-REFERENCE TO RELATED APPLICATIONS

This application claims the benefit of U.S. Provisional Application No. 61/457,134 filed on Jan. 10, 2011.

FIELD

The present invention relates to a hoop for a drum, and more particularly to an annular drum hoop that retains a drum head or skin.

BACKGROUND

Drum hoops, or rims, are needed to hold a drum head in place and apply even tension to the drum head for tuning. Most drum hoops are die cast, wood or flanged.

Die cast drum hoops are made by pouring molten metal into a mold having the shape and size desired for a finished drum hoop. Die cast drum hoops usually provide a thicker, and therefore stronger, rim than flanged hoops which allows the drum head to be more evenly tuned because the die cast hoop is often more responsive through a tuning range. However, die cast hoops have limited flex and may therefore make the drum more difficult to tune when a drum shell, to which the drum hoop is attached, or the head is not completely round due to the limited amount of flex.

Wood drum hoops can be rigid or flexible depending on how they' are made. As a result, wood drum hoops may have tuning features similar to those of die cast drum hoops if the wood drum hoop is constructed to be more rigid or may have tuning features similar to those of flanged hoops if the wood drum hoop is constructed to be more flexible. An interesting feature of wood drum hoops is that they will absorb vibration and act like an extension of the drum shell which gives the drum a bright resonance.

The most common type of drum hoop is the flanged drum hoop which is usually comprised of metal of varying thickness. The hardness of the metal will have an affect on the sound and the ability to tune the drum. Flanged drum hoops are usually made by folding a strip of metal to create a series of bends of approximately 90 degrees called "flanges." Most modern drum hoops have three bends and are therefore referred to as "triple-flanged" hoops. The folding of the metal strips is usually done by stamping the metal. The stamped metal is then made into a circle and welded at adjoining ends. Holes are punched into the metal to receive tension rods which pass through the hoop and screw into lugs attached to the body of the drum.

In a conventional drum, an annular drum hoop is provided at an end of the drum body and a drum head is fixed over an open end of the drum body by a drum hoop. The hoop may have a diameter which is slightly larger than the diameter of the drum body and is installed on the drum body such that the hoop presses on a bead around the periphery of the drum head. The hoop is generally fixed to the drum body by a plurality of lug bolts which are screwed into and tightened in threaded holes in respective lugs which are arranged around the drum body. Tension on the drum head is adjusted by adjusting the tightening length of the various lug bolts.

SUMMARY

At least one embodiment of the present invention includes a hoop for securing a drum head to a drum. The hoop may include a lower portion configured to mount the hoop to a shell of the drum and a flange formed in the lower portion of the hoop. The flange is configured to receive a tension control device for tuning the drum head. The hoop may also include an upper portion that is above and normal to the flange and an annular upper edge formed on the upper portion of the hoop that is rolled over and bent inward toward an inner peripheral surface of the hoop.

By rolling and securing the surfaces of the annular upper edge and the inner peripheral surface, the hoop may have an increased rigidity compared to other flange hoops and may better withstand wear caused for example by drumming performed on the hoop. The drum hoop configured as described above may also result in a low mass hoop having increased structural integrity while maintaining flexibility to allow a drum having the described hoop to be tuned even when the drum shell or the head is not completely round. In this regard, the hoop may be formed from lighter weight metals with hoop dimensions which result in a reduced overall mass of the drum hoop while maintaining equivalent or improved structural integrity and performance.

BRIEF DESCRIPTION OF THE DRAWINGS

The present invention will become more fully understood from the detailed description given below and the accompanying drawings, which are given for purposes of illustration only and thus, do not limit the invention. In the drawings which illustrate the best mode presently contemplated for carrying out the present invention:

FIG. 4 is a cross-sectional view of a tension control device and the hoop of FIG. 1;

FIG. 5 is a perspective view of the tension control device and the hoop of FIG. 4;

Figure 1:
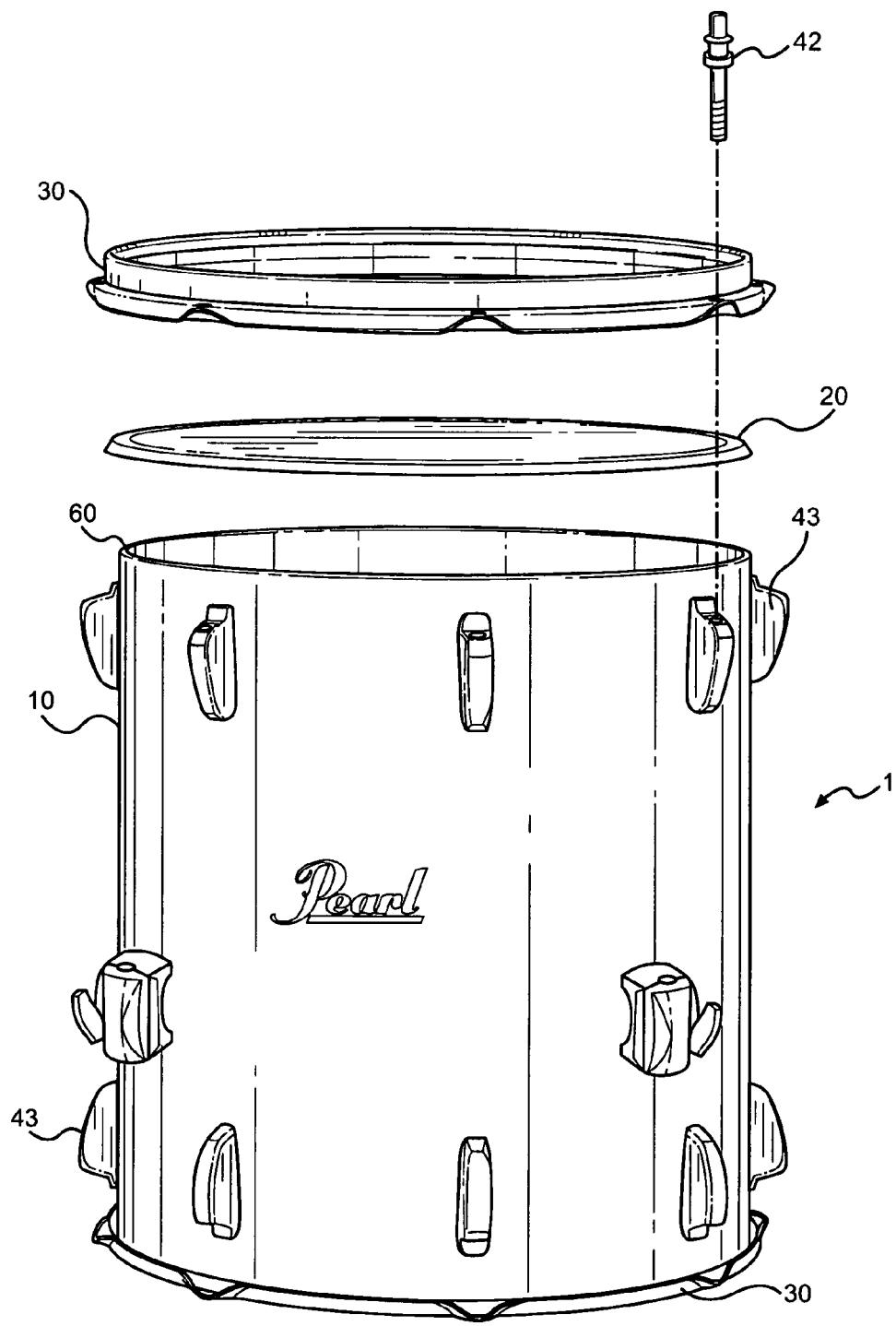
FIG. 1 is an exploded view of a drum assembly including an example embodiment of the claimed drum hoop.

These drawings have been provided to assist in the understanding of the exemplary embodiments of the invention as described in more detail below and should not be construed as unduly limiting the invention. In particular, the relative spacing, positioning, sizing and dimensions of the various elements illustrated in the drawings may not be drawn to scale and may have been exaggerated, reduced or otherwise modified for the purpose of improved clarity.

Those of ordinary skill in the art will also appreciate that a range of alternative configurations may have been omitted simply to improve the clarity and reduce the number of drawings. Those of ordinary skill will appreciate that certain of the various process steps illustrated or described with respect to the exemplary embodiments may be selectively and independently combined to create other methods useful for manufacturing drum hoops without departing from the scope and spirit of this disclosure.

DETAILED DESCRIPTION OF EXAMPLE EMBODIMENTS

Referring now to the drawings in which like reference numerals designate like or corresponding parts throughout the several views, there is shown an example embodiment of a hoop for a drum.

As shown in FIG. 1, a drum 1 includes a cylindrical shell 10 and at least one drum head 20. An annular drum hoop 30 is provided to retain the drum head 20 and to mount the drum head 20 to the shell 10. The drum shell 10 may have opposing openings at least one of which may be covered by the drum head 20 mounted in the hoop 30 thereby providing a tone when the drum 1 is played. As shown in the embodiment of FIG. 1, the drum 1 may have two hoops 30, each of which includes a drum head 20 and multiple tension control devices 40 (FIG. 3) to tune the drum 1.

Figure 2:
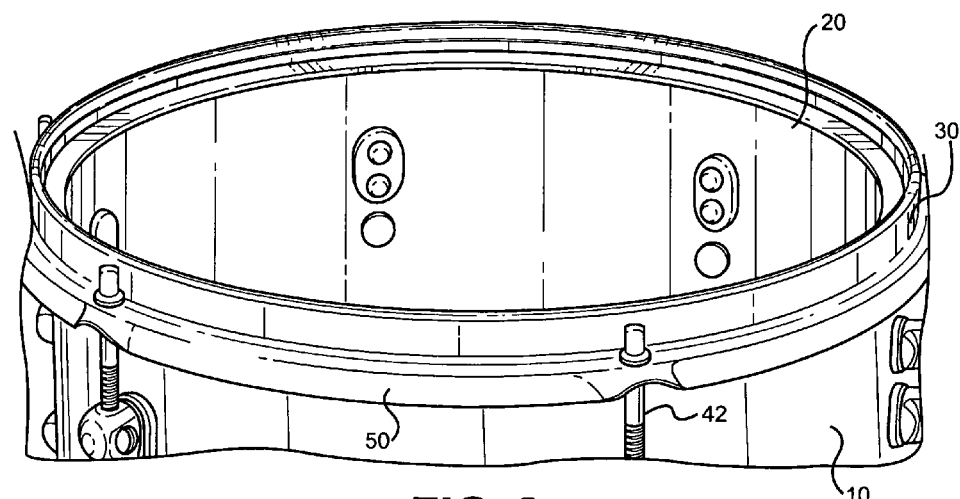
FIG. 2 is a partial perspective view of an example embodiment of a drum hoop on a drum shell without a drum head.
Figure 3:
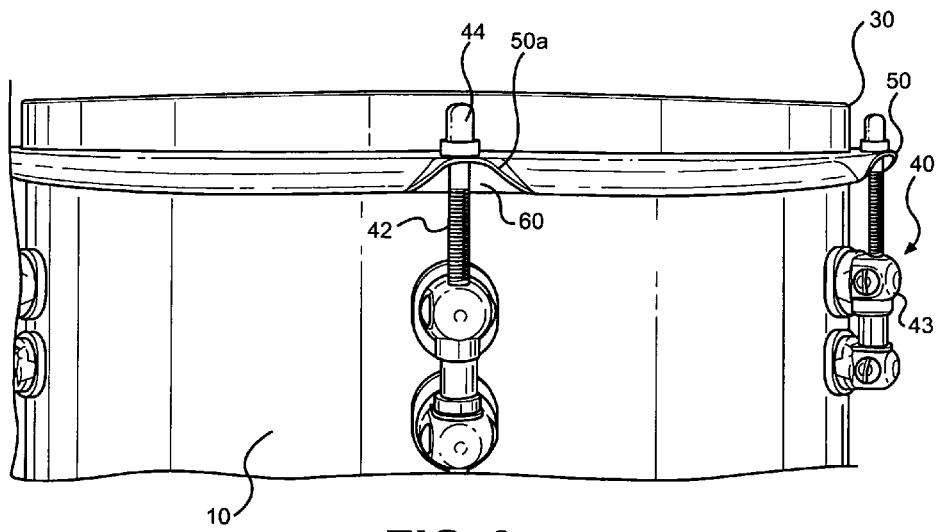
FIG. 3 is a side view of a drum having an example embodiment of the hoop.

As shown in FIGS. 2 and 3, the tension control devices 40 are attached to both the drum shell 10 and to the hoop 30 at a flange portion 50 formed in the hoop 30. In the example embodiments of FIGS. 2 and 3, the tension control devices 40 may include a tension rod 42 that connects the hoop 30 to the drum shell 10 at a lug 43. The lugs 43 are attached through a sidewall of the drum 10 by studs or screws, for example. The tension rod 42 may be threaded at a first end to thread into the lug 43. A screw head 44 on a second end of the tension rod 42 may be used to rotate the tension rod 42 thereby tightening or loosening the hoop 30 and applying more or less tension to the drum head 20 for tuning. As shown in FIGS. 1-3, the hoop 30 is fitted around a ring 60 of the drum head 20.

In example embodiments, the hoop 30 may be comprised of a metal or metal alloy or other material that may be configured into a hoop. In example embodiments, the hoop 30 may be made of aluminum, steel, alloys thereof, as well as alloys of zinc and iron, for example.

As shown in FIGS. 4 and 5, the threaded end 42a of the tension rod 42 is adjustably received in the lug 43 and may be moved into and out of the lug 43 by rotating the screw head or nut 44 at an opposing end of the tension rod 42 to concomitantly tighten or loosen the tension on the drum head 20 for tuning.

To connect the hoop 30 and the drum head 20 to the shell 10, the tension rod 42 is passed through an opening or through hole in the flange portion 50 of the hoop 30. In an embodiment, the opening is formed in a raised portion or ear 50a of the flange 50 (FIG. 5). As shown in FIG. 4, the drum head 20 is arranged over an opening at one end of the drum shell 10. An outer edge of the drum head 20 is received in a U-shaped channel 120 which is filled with glue 130 to hold the drum head 20 in position. The hoop 20 is then placed over the drum head 20 and the tension rods 42 are inserted through the ears 50a in the flange 50. The threaded end 42a of the tension rods 42 are threaded into respective lugs 43 to secure the hoop 30 to the drum shell 10.

Figure 6:
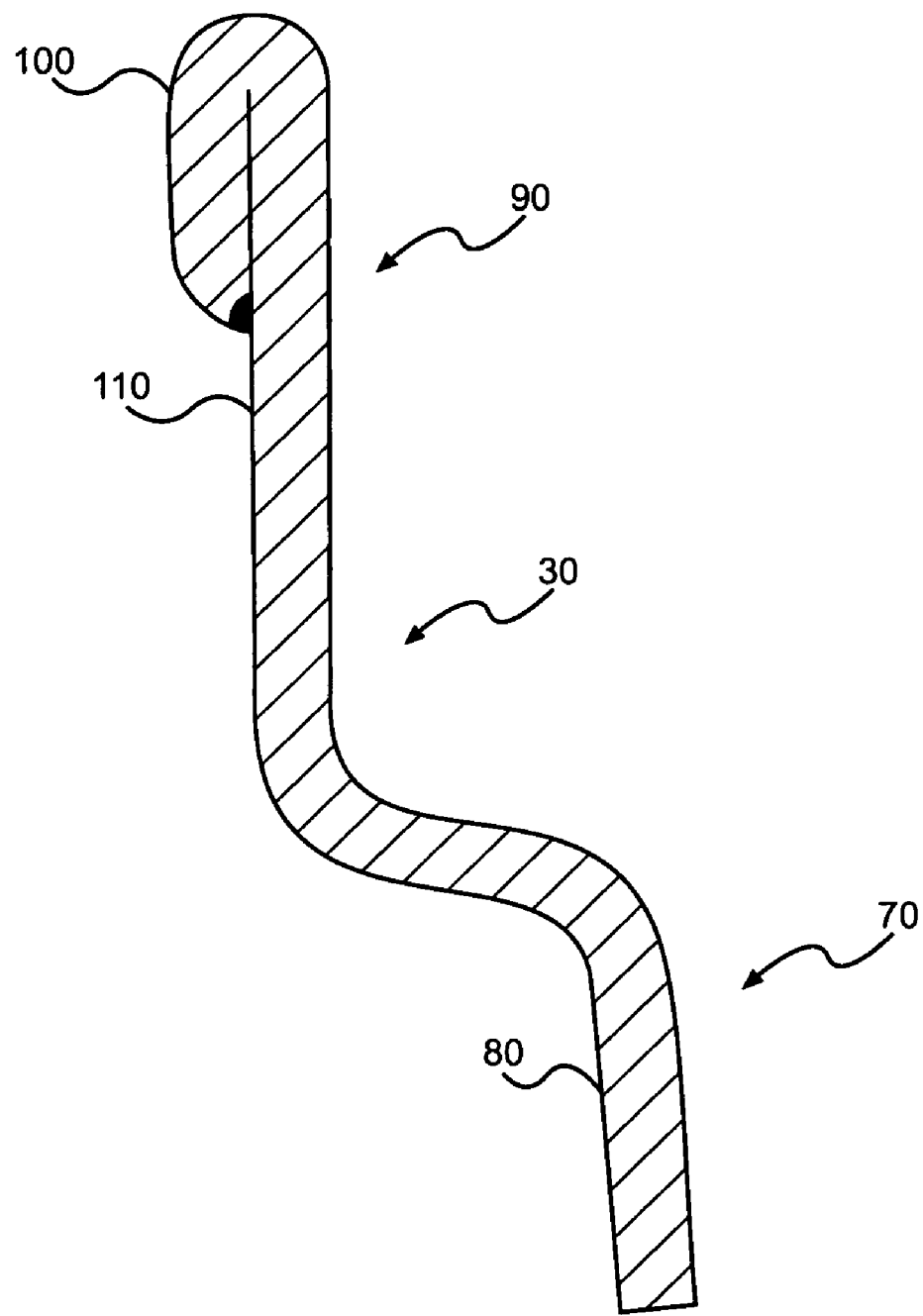
FIG. 6 shows a schematic cross-sectional view of an example embodiment of the hoop.

In an example embodiment of the hoop 30 shown in FIG. 6, the hoop 30 may include a lower portion 70 having a first inner portion 80. The first inner portion 80 faces toward the drum shell 10 when installed and receives the drum head 20. The flanges 50 are formed by a bend in the lower portion 70 to mount the hoop 30 to the drum shell 10 via the tension control devices 40. The hoop 30 also includes an upper portion 90 that is above and normal to the surface of the drum head 20 when assembled. The upper portion 90 is at an approximately 90° angle to the bend in the flange at the lower portion 70.

An upper edge 100 of the upper portion 90 of the hoop 30 is rolled over and bent onto an inner peripheral surface 110 of the hoop which also faces toward the drum shell 10 when installed (FIGS. 1 and 2). At least a portion of the upper edge 100 may be adhered to at least a portion of the inner peripheral surface 110 thereby securing the surfaces of the upper edge 100 and the inner peripheral surface 110. In an example embodiment, surfaces of the upper edge 100 and the inner peripheral surface 110 may be adhered to one another by welding, soldering, crimping, gluing, or the like. In an example embodiment, the entire upper edge, including the area where the surfaces are joined, are above the top surface of the drum head 20.

By rolling and securing the surfaces of the upper edge 100 and the inner peripheral surface 110, the hoop 30 has an increased rigidity compared to other flange hoops and may better withstand wear caused, for example, by drumming performed on the hoop 30. The hoop described above also results in a low mass hoop having increased structural integrity while maintaining flexibility to allow a drum having the described hoop to be tuned even when the drum shell or the head is not completely round. In this regard, the hoop 30 may be formed from lighter weight metals with hoop dimensions to reduce the overall mass of the hoop while maintaining equivalent or improved structural integrity and performance.

Figure 7:
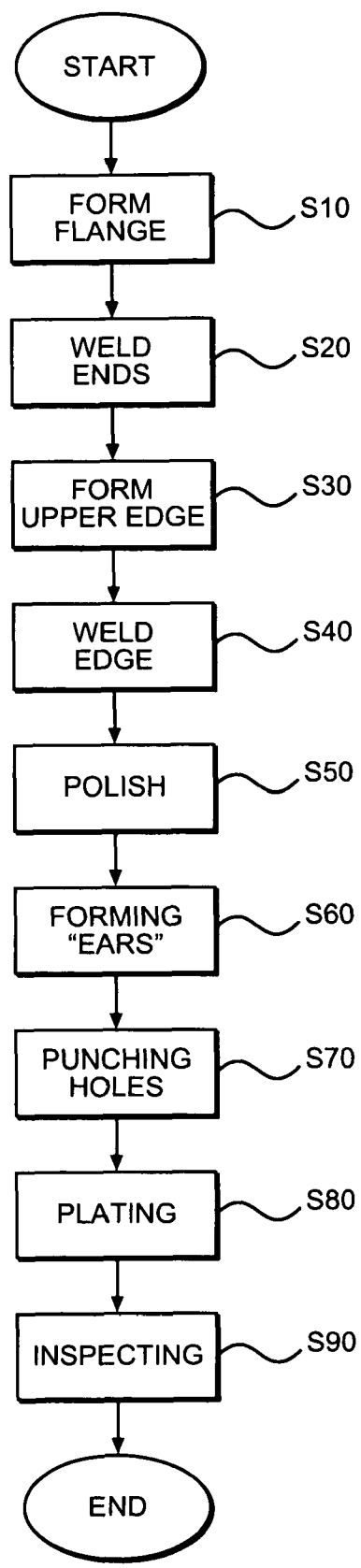
FIG. 7 is a flowchart showing a process of forming the hoop.
Figure 8:
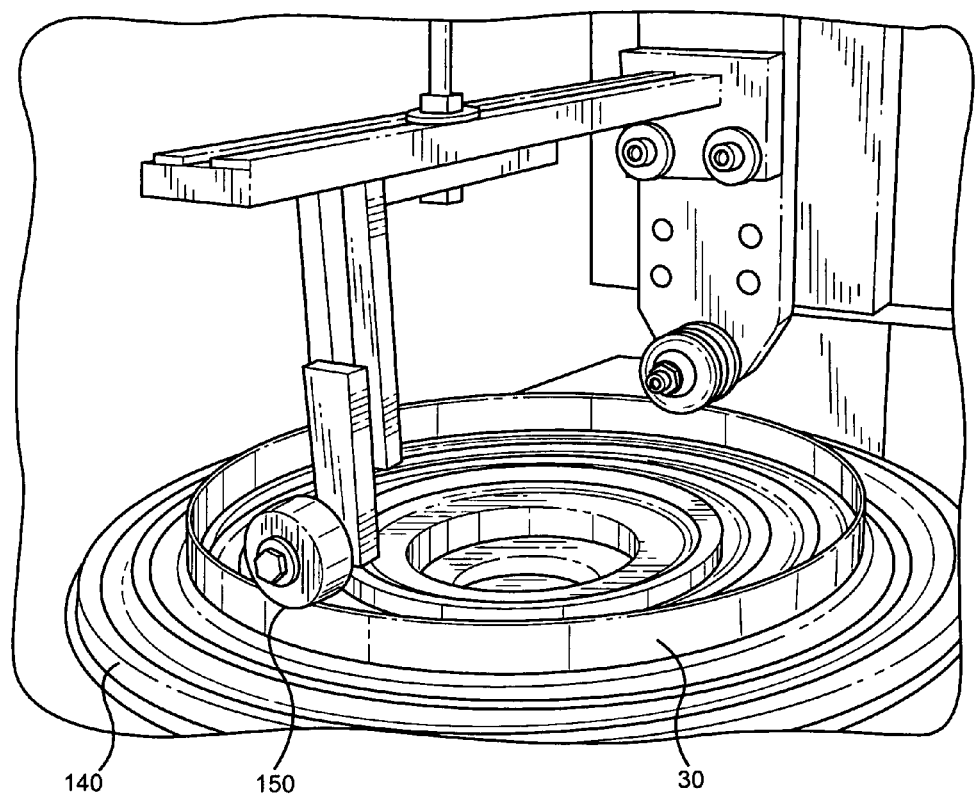
FIG. 8. shows an example embodiment of a device for forming the hoop.

An example embodiment of creating the hoop 30 is described with reference to FIG. 7. At step S10 the hoop 30 may be formed by rolling sheet stock, or ribbon stock, of metal, or the like, through a series of rollers to form the flange 50 between the upper portion 90 and the lower portion 70. Passing the sheet stock through the rollers also bends the stock in an essentially circular shape. After the initial bends are made, the free ends of the stock are joined by welding or the like to form a hoop at step S20. The completed hoop 30 is then further processed so that the upper edge 100 is then formed on the upper portion 90 by placing the hoop 30 on a wheel 140. For example, as shown in FIG. 8, the hoop is placed on a turning wheel 140 thereby spinning the hoop 30. While the hoop 30 is spinning on the wheel 140, one or more die rollers 150 are engaged with the upper portion 90 of the hoop 30 and, by applying pressure to the die rollers 150, the upper edge 100 of the upper portion 90 is bent inwardly toward the inner peripheral surface 110 at step S30. Upon completion of the bending process, the hoop 30 is removed from the wheel 140 and the upper edge is fixed to the inner peripheral surface 110 at step S40. In an example embodiment, the upper edge is fixed to the inner peripheral surface 110 by a welding process performed at step S40.

During the welding process, the upper edge 100 of the upper portion 90 is fixed to the inner peripheral surface 110 by welding. In an example embodiment, the hoop 30 may be spun to bring the entire circumference of the hoop 30 into contact with a fixed welding device such that the upper edge 100 of the upper portion 90 is fixed to the inner peripheral surface 110 about an entire circumference of the hoop 30. In an embodiment, the hoop 30 may be fixed while the welding device is moved about the circumference of the hoop to weld the upper edge 100 of the upper portion 90 is fixed to the inner peripheral surface 110. In an embodiment, the weld may be made intermittently about the circumference or may be made with a continuous bead.

In an embodiment, the upper edge 100 of the upper portion 90 may fixed to the inner peripheral surface 110 by soldering, gluing, or the like, using techniques similar to those described above. For example, a bead of solder or glue may be placed continuously or intermittently about the circumference of the hoop such that the upper edge 100 of the upper portion 90 is fixed to the inner peripheral surface 110. In an embodiment, the hoop may be spun while the glue is applied or the hoop may be stationary while the glue is applied about the upper edge 100 of the upper portion 90 to fix the upper edge 100 to the inner peripheral surface 110.

Subsequent to fixing the upper edge 100 to the inner peripheral surface 110 at step S40, the hoop 30 may be polished at step S50 in preparation of subsequent processing. For example, at step S60 "ears" 50a may be formed on the flange 50 and holes may be formed therein at step S70 to receive the tension rod 42. In an example embodiment, the holes may be formed by a punching process at step S70. Upon completion of the above processing steps, the hoop may be plated to receive, for example, a chrome finish or other finish as desired at step S80. Upon completion of the process steps described above the hoop may be inspected for possible defects and/or compliance with predetermined specifications at step S90 after which the process ends.

The above detailed description describes example embodiments of the present invention. Persons skilled in the art will recognize that alternative embodiments are possible without departing from the scope and spirit of the present invention. The above detailed description describes different embodiments of the present invention. For example, the example embodiments of the drum hoop discussed may be made of a variety of materials without departing from the scope and intent of this invention.

What is claimed is:

1. A hoop for securing a drum head to a drum, the hoop comprising:
    a lower portion configured to mount the hoop to a shell of the drum;
    at least one flange formed in the lower portion of the hoop, the at least one flange configured to receive a tension control device for tuning the drum head;
    an upper portion that is above and normal to the flange;
    an annular upper edge formed on the upper portion of the hoop, the upper edge being rolled over and bent inward toward an inner peripheral surface of the hoop.
2. The hoop of claim 1, wherein the annular upper edge is fixed to the inner peripheral surface of the hoop.
3. The hoop of claim 2, wherein there is no gap between surfaces of the bent upper edge and the inner peripheral surface of the hoop.
4. The hoop of claim 1, wherein the flange includes ears formed therein and the ears have a through hole configured to receive a tension rod of the tension control device.
5. The hoop of claim 2, wherein the surface of the upper edge is fixed to the inner peripheral surface by at least one of welding, soldering, crimping and gluing.
6. A method of manufacturing a hoop for securing a drum head to a drum, the method comprising:
    forming a first bent portion in a metal ribbon in a first direction;
    forming a second bent portion in the metal ribbon in a direction substantially opposite the first direction to form a flange portion;
    folding the second bent portion such that facing surfaces of the second bent portion contact one another; and
    fixing the facing surfaces of the second bent portion together.
7. The method of claim 6, wherein folding the second bent portion includes:
    placing the hoop on a wheel;
    spinning the wheel and the hoop;
    pressing at least one die roller against an upper most surface of the second bent portion thereby further bending a top portion of the second bent portion substantially parallel to the second bent portion.
8. The method of claim 6, wherein fixing the facing surfaces of the second bent portion together includes:
    fixing the facing surfaces of the second bent portion while the hoop is turning.
9. The method of claim 6, wherein fixing the facing surfaces of the second bent portion together includes:
    fixing the facing surfaces of the second bent portion while the hoop is stationary.
10. The method of claim 6, wherein fixing the facing surfaces of the second bent portion together includes:
    welding the facing surfaces of the second bent portion by turning the hoop and bringing the turning hoop into contact with a fixed welding point.
11. The method of claim 6, wherein fixing the facing surfaces of the second bent portion together includes:
    welding the facing surfaces of the second bent portion by bringing a movable welding point into contact with the hoop while the hoop is stationary.

* * * * *